United States Patent [19]

Umeda et al.

[11] Patent Number: 5,039,343

[45] Date of Patent: Aug. 13, 1991

[54] WATER BORNE METALLIC COATING COMPOSITION

[75] Inventors: Shinichiro Umeda, Kyoto; Yoshitaka Okude, Hirakata; Teruaki Kuwajima, Higashiosaka; Sakuichi Konishi, Ikoma; Satoru Nagahata, Shinagawa; Masakazu Watanabe, Toyonaka, all of Japan

[73] Assignee: Nippon Paint Co., Ltd., Osaka, Japan

[21] Appl. No.: 509,508

[22] Filed: Apr. 16, 1990

[30] Foreign Application Priority Data

Apr. 17, 1989 [JP] Japan ................................ 1-98091
Apr. 17, 1989 [JP] Japan ................................ 1-98092
Apr. 17, 1989 [JP] Japan ................................ 1-98093

[51] Int. Cl.$^5$ .............................................. C09L 1/62
[52] U.S. Cl. ...................................... 106/404; 106/403
[58] Field of Search ................ 106/404, 499, 403, 401

[56] References Cited

U.S. PATENT DOCUMENTS

| 4,350,535 | 9/1982 | Ishijima et al. | 106/300 Q |
| 4,373,043 | 2/1983 | Yagi et al. | 524/130 |
| 4,522,972 | 6/1985 | Mondt et al. | 524/548 |
| 4,524,173 | 6/1985 | Rehfuss et al. | 524/512 |
| 4,730,020 | 3/1988 | Wilfinger et al. | |
| 4,839,414 | 6/1989 | Bederks et al. | 524/507 |
| 4,948,829 | 8/1990 | Mitsuji et al. | 524/457 |

OTHER PUBLICATIONS

Data Base WPIL, No. 89-127 220, Derwent Publications Ltd., London.

Primary Examiner—William R. Dixon, Jr.
Assistant Examiner—Alan Wright
Attorney, Agent, or Firm—Wenderoth, Lind & Ponack

[57] ABSTRACT

The present invention provides a water borne metallic coating composition which stably disperses a metallic pigment and provides good metallic appearance independently of coating conditions. The water borne coating composition of the present invention comprises a specific film forming polymer (I), a specific fluorine containing compound (II), a metallic pigment (III), a crosslinking agent (IV), a compound (V) selected from the group consisting of a phosphorus containing titanate coupling agent and a phosphoric mono- or di-ester of a $C_{11}$-$C_{24}$ organic compound.

10 Claims, No Drawings

WATER BORNE METALLIC COATING COMPOSITION

FIELD OF THE INVENTION

The present invention relates to a water borne metallic coating composition.

BACKGROUND OF THE INVENTION

Metallic finish of automobiles is generally carried out as follow: A steel panel which is pretreated with zinc phosphate etc. is primered by electrocoating and cured. Then, the primered panel is intermediated coated and cured. The intermediated coated panel is coated with a thermosetting metallic paint and then, without baking it, coated with a thermosetting clear paint. The coating process is called "Wet On Wet" coating. The wet on wet coated panel is subsequently baked to cure both metallic and clear coatings. The process is also called "2 coat 1 bake".

The metallic paint for the "Wet On Wet" coating process conventionally employs an organic solvent as a diluent, because it has to be rapidly dried and kept surface smooth so as to coat thereon the clear paint without roughing the interface between the metallic and clear coatings. On the other hand, the use of such organic solvent borne paint is apt to be limited in view of environmental pollution, working atmosphere and natural resouces saving. Accordingly, water borne paint becomes more noteworthy. However, when water is employed as a diluent of metallic paint, there are two big problems. One is that, when metallic pigment is incorporated into water borne paint, the metallic pigment is reacted with water to generate hydrogen gas which may be often associated with explosion danger. This problem is especially serious in automotive industries in which paint is stored in a closed container for a long period of time before use.

The second problem is that, when water is employed as a diluent, it is very difficult to control an evaporation loss of water when coating, and therefore impossible to obtain good appearance. For example, in case where coating is carried out at a high relative humidity, an evaporation loss of water is very small and the viscosity of the paint remains low. It may cause sagging and poor orientation of metallic pigment, which provides poor appearance. In case where coating is carried out at a low relative humidity, an evaporation lass of water is large and the viscosity of the paint is too high. It may cause the decline of flowability of the paint, which also provides poor appearance.

SUMMARY OF THE INVENTION

The present invention provides a water borne metallic coating composition which stably disperses a metallic pigment and provides good metallic appearance independently of coating conditions. The water borne coating composition of the present invention comprises;

(I) a film forming polymer having a molecular weight of 6,000 to 50,000, prepared by copolymerizing 5 to 40% by weight of an amide group containing ethylenic monomer, 3 to 15% by weight of an acid group containing ethylenic monomer, 10 to 40% by weight of a hydroxyl group containing ethylenic monomer and the balance of other ethylenic monomer followed by neutralizing at least a portion of the acid group; % by weight being based on the total monomer weight, (II) a fluorine containing compound which has both a $C_nF_{2n+1}-$ or $-C_nF_{2n}-$ group wherein n is an integer of 1 to 20, and at least one acid group or a salt thereof, (III) a metallic pigment, (IV) a crosslinking agent selected from at least one group consisting of an amino compound, an isocyanate compound and an epoxy compound which are crosslinked with said polymer (I), (V) a compound selected from the group consisting of a phosphorus containing titanate coupling agent and a phosphoric mono-or di-ester of a $C_{11}$-$C_{24}$ organic compound;

wherein said compound (II) is present in an amount of 0.01 to 5 parts by weight, said pigment (III) is present in an amount of 2 to 30 parts by weight, said agent (IV) is present in an amount of 5 to 120 parts by weight and the compound (V) is present in an amount of 0.04 to 30 parts by weight, based on 100 parts by weight of the polymer (I).

DETAILED DESCRIPTION OF THE PRESENT INVENTION

The amide group containing ethylenic monomer which constitutes the film forming polymer (I) of the present invention imparts hydrophilic properties to the polymer and enhances cohesive force. It also provides with high dispersibility of the metallic pigment. Typical examples of the monomers are acrylamide, N-methylolacrylamide, methacrylamide, N-methylolmethacrylamide, alkoxymethyl(meth)acrylamide and the like.

The acid group containing ethylenic monomer imparts water solubility to the polymer (I). The acid group includes a carboxyl group, a sulfonic acid group and the like. Typical examples of the monomers having a carboxyl group are acrylic acid, methacrylic acid, crotonic acid, ethacrylic acid, propylacrylic acid, isopropylacrylic acid and the like. Typical examples of the monomers having sulfonic acid group are t-butylacrylamide sulfonic acid and the like. It is preferred that at least a portion of the acid group of the acid group containing ethylenic monomer is the sulfonic acid group which may promote curing reactions. It is also preferred that a portion of the carboxyl group containing ethylenic monomer is a half-ester, half-amide or half-thioester of a dibasic acid monomer (e.g. maleic acid, fumaric acid and itaconic acid). Alcohols for forming the half-ester are those having 1 to 12 carbon atoms, for example methanol, ethanol, propanol, butanol, ethyleneglycol monomethyl ether, ethyleneglycol monoethyl ether, dimethylaminoethanol, diethylaminoethanol, acetol, allyl alcohol, propargyl alcohol and the like. Preferred are butanol, ethylaminoethanol, acetol, allyl alcohol and propargyl alcohol. Amines for forming the half-amide are those having 1 to 12 carbon atoms, for example ethylamine, diethylamide, butylamine, dibytylamine, cyclohexylamine, aniline, naphthylamine and the like. Preferred is aniline. Mercaptanes for forming the half-thioester are those having 1 to 12 carbon atoms, for example, ethyl mercaptane, butyl mercaptane and the like. The half-thioester has bad smell and therefore the half-ester or half-amide is preferred. The reaction for producing the half-ester, half-amide or half-thioester compounds is known to the art, but preferably conducted at a temperature of room temperature to 120° C., optionally in the presence of a catalyst of tirtiary amines.

The hydroxyl group containing ethylenic monomer provides with curing sites at an elevated temperature. Typical examples of the monomers are hydroxyethyl acrylate, hydroxypropyl acrylate, hydroxybutyl acrylate, hydroxymethyl methacrylate, hydroxyethyl methacrylate, hydroxypropyl methacrylate, hydroxybutyl methacrylate, allyl alcohol and the like.

The other ethylenic monomer which is copolymerizable with the above mentioned monomers includes acrylate or methacrylate which may be expressed as "(meth)acrylate", such as methyl (meth)acrylate, ethyl (meth)acrylate, isopropyl (meth)acrylate, n-propyl (meth)acrylate, n-butyl (meth)acrylate, t-butyl (meth)acrylate, 2-ethylhexyl (meth)acrylate, n-octyl (meth)acrylate, lauryl (meth)acrylate, stearyl (meth)acrylate, dodecyl (meth)acrylate etc.; a reaction product of a fatty acid and (meth)acrylate having an oxirane group, such as a reaction product of stearic acid and glycidyl methacrylate; a reaction product of an oxirane compound and (meth)acrylic acid, such as Japanese Patent Nos. 583185 and 609322; styrene and a derivative thereof, such as alpha-methylstyrene, o-methylstyrene, m-methylstyrene, p-methylstyrene, p-tert-butylstyrene, benzyl (meth)acrylate etc.; a dibasic acid diester, such as dimethyl itaconate, dimethyl maleate, dimethyl fumarate etc.; a nitrile, such as acrylonitrile, methacrylonitrile, etc.; vinyl acetate; and the like.

The film forming polymer can be prepared by polymerizing a monomer mixture which contains 5 to 40% by weight of the amide group containing ethylenic monomer, 3 to 15% by weight of the acid group containing ethylenic monomer, 10 to 40% by weight of the hydroxyl group containing ethylenic monomer and the balance of the other ethylenic monomer. If the amounts of the monomers are outside the range mentioned above, the physical properties obtained from each monomer are deteriorated. The copolymerizing process is known to the art, but generally carried out by mixing the monomer mixture with a polymerization initiator and heating in the presence of a solvent. Typical examples of the polymerization initiators are peroxides such as benzoyl peroxide, t-butyl peroxide, cumen hydroperoxide etc.; azo compounds, such as azobisisovaleronitrile, azobisisobutylonitrile etc.; and the like. Suitable solvents for the copolymerization are aromatic hydrocarbons, such as benzene, xylene, toluene etc.; esters, such as ethyleneglycol monomethyl ether acetate, ethyleneglycol monoethyl ether acetate, ethyleneglycol monobutyl ether acetate, ethyl acetate etc.; ethers, such as ethyleneglycol monomethyl ether, ethyleneglycol monoethyl ether, ethyleneglycol monobutyl ether, butyl carbitol etc.; ketones, such as acetone, methyl ethyl ketone, methyl isobutyl ketone etc.; alcohols, such as t-butanol, isobutanol, n-butanol, isopropanol, n-propanol, ethanol etc; and the like.

The film forming polymer (I) preferably has a number average molecular weight of 6,000 to 50,000, preferably 8,000 to 30,000. The molecular weight is determined by the gel permeation chromatography (GPC) method.

At least a portion of the acid groups of the obtained polymer (I) is neutralized with a basic material. Neutralization is carried out by conventional methods. Typical examples of the basic materials are monomethylamine, dimethylamine, trimethylamine, monoethylamine, triethylamine, monoisopropylamine, diisopropylamine, diethylenetriamine, triethylenetetramine, monoethanolamine, diethanolamine, triethanolamine, monoisopropanolamine, diisopropanolamine, dimethyethanolamine, morpholine, methylmorpholine, piperazine, ammonia, sodium hydroxide, potassium hydroxide, lithium hydroxide and the like. An amount of the basic material is preferably 0.3 to 1.2 equivalent based on that of the acid group.

The fluorine containing compound (II) employed in the present invention is formulated in the composition in order to impart brightness to the cured film. The compound (II) has both a $C_nF_{2n+1}$— or —$C_nF_{2n}$— group wherein n is an integer of 1 to 20, and at least one acid group (e.g. carboxyl group, sulfonic acid group or phophoric acid group) or a salt thereof. Typical examples of the compounds (II) are $CF_3CO_2H$, $C_3F_7CO_2H$, $C_7F_{15}CO_2H$, $C_8F_{17}CO_2H$, $HO_2C-(CF_2)_4-CO_2H$, $[C_8F_{17}SO_2N(CH_3)C_2H_4O]_2PO(OH)$, $[C_8F_{17}SO_2N(CH_3)C_2H_4O]_2PO(ONH_4)$, $C_8F_{17}SO_2N(CH_3)C_2H_4OSO_3H$, $C_8F_{17}SO_2N(C_3H_7)CH_2CO_2K$, $C_8F_{17}SO_3K$, $C_8F_{17}SO_3Na$, $C_8F_{17}SO_3NH_4$, $C_8F_{17}SO_3Li$ and the like.

The metallic pigment (III) of the present invention can be aluminum, gold bronze, gold, iron, stainless steel, nickel, zinc, tin, chromium, lead, bismuth, an alloy thereof and the like. Preferred is aluminum. The metallic pigment is not limited in shape, preferably powder or flakes. Preferred are flakes.

The metallic pigment (III) is preferably formulated in the coating composition in the form of a mixture of 100 parts by weight of the metallic pigment and 2 to 100 parts by weight of a phosphorus compound prepared by reacting an organic phosphate (VI) represented by

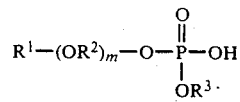

wherein $R^1$ represents a $C_2$–$C_{24}$ alkyl group (e.g. hexyl, heptyl, octyl, nonyl, lauryl etc.), a $C_2$–$C_{24}$ alkenyl group (e.g. stearyl etc.) or an aryl group having at least one $C_2$–$C_{24}$ alkyl substituent (e.g. octylphenyl, nonylphenyl, dodecylphenyl, dinonylphenyl etc.), $R^2$ represents a $C_2$–$C_4$ alkylene group (e.g. ethylene, propylene etc.), $R^3$ represents a hydrogen atom, a $C_2$–$C_{24}$ alkyl group, a $C_2$–$C_{24}$ alkenyl group, a $C_6$–$C_{24}$ aryl group, a $C_6$–$C_{24}$ alkaryl group or a $R^1$-$(OR^2)_m$- group, and m is 0 or an integer of 1 to 20, with a fluorine containing compound (VII) having a $C_nF_{2n+1}$— or —$C_nF_{2n}$— group wherein n is an integer of 1 to 20 and at least one primary hydroxyl group or epoxy group, in a molar ration (VI)/(VII) of 1/1 to 1/0.01. Typical examples of the organic phosphates (VI) are, when R is an alkyl group, hexylphosphate, heptylphosphate, decylphosphate, undecylphosphate, laurylphosphate, tridecylphosphate, myristylphosphate, pentadecylphosphate, nonadecylphosphate, eicosylphosphate, heneicosylphosphate, docosylphosphate, tricosylphosphate, tetracosylphosphate, 2-methyl-7-ethyl-4-undesylphosphate, trimethylnonylphosphate, an alkyleneoxide additive thereof and the like; when R is an alkenyl group, 4-dodecenylphosphate, cis-9-octadecenylphosphate, 3-methyl-2-nonenylphosphate, 5,9-dimethyl-2-decenylphosphate, an alkyleneoxide additive thereof; when R is an aryl group, octylphenylphosphate, nonylphenylphosphate, dodecylphenylphosphate, an alkyleneoxide additive thereof and the like; and a mixture thereof. The phosphate may be either mono-ester or di-ester, or a combination thereof. The phosphate may be commercially available or obtained by known methods from an alcohol and phosphoric acid. Typical examples of the fluorine containing compounds (VII) are those having a primary hydroxyl group, such as CF$_3$—CH$_2$CH$_2$—OH, C$_4$F$_9$—CH$_2$CH$_2$—OH, C$_4$F$_9$CH$_2$OH, HO(CH$_2$)$_2$(C$_2$F$_4$)$_2$(CH$_2$)$_2$OH,

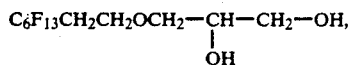

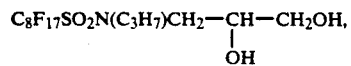

HO(C$_6$H$_4$)—C(CF$_3$)$_2$—(C$_6$H$_4$)—OH, those having an epoxy group, such as

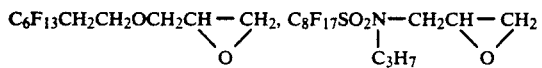

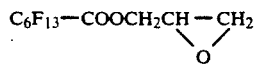

and the like. In case of the compound (VII) having a primary hydroxyl group, the reaction may be carried out at 150° to 280° C., preferably 180° to 250° C. for 1 to 48 hours, preferably 1 to 24 hours in a solvent. The solvent is not limited, but preferably an aromatic solvent, such as toluene, xylene and the like. In case of the compound (VII) having an epoxy group, the reaction may be carried out at 50° to 150° C., preferably 70° to 120° C. for 0.5 to 10 hours, preferably 1 to 5 hours in the same solvent. A catalyst, such as phophoric acid, may be added thereto. It is preferred that the reaction is controlled to leave at least one phosphoric hydroxyl group in the obtained reaction product. The metallic pigment mixture can be prepared with any methods wherein the pigment is contacted with the phosphorus compound. For example, the mixture may be prepared by ball-milling metal with an organic solvent and a lubricant in the presence of the phosphorus compound. Also, a metallic pigment paste, i.e. a paste of metal flakes, a solvent and the like, may be prepared by ball-milling in a known method and then mixed with the phosphorus compound. Further, after removing the organic solvent and the lubricant from the metallic pigment paste, the pigment is mixed with the phosphorus compound. Typical examples of the organic solvents employed in the production of the metallic pigment paste are mineral spirit, solvent naphtha and the like. Typical examples of the lubricants are unsaturated fatty acids, saturated fatty acids, aliphatic amines and the like. An amount of the phosphorus compound can be varied depending upon many factors, but generally within the range of 2 to 100 parts by weight, preferably 2 to 50 parts by weight based on 100 parts by weight of metal pigment only. Amounts of less than 2 parts by weight deteriorate storage stability of a waterborne metallic paint, thus generating hydrogen gas. Amounts of more than 100 parts by weight can be used, but do not enhance technical effects in proportion to the increase of the amount.

The crosslinking agent (IV) of the present invention is added to cure the polymer (I) and may be selected from the group consisting of an amino compound, an isocyanate compound and an epoxy compound. Typical examples of the crosslinking agents (IV) are a blocked polyisocyanate; alkoxylated melamine-formaldehyde condensate, such as methoxymethylolmelamine, isobutoxymethylolmelamine and n-butoxymethylolmelamine; an epoxy compound having at least two epoxy group, such as Epicoat 828, 1001 or 1004 (available from Shell Chemical Company), Epolite 40E, 400E, #1600 or #721 (available from Kyoei Oil and Fat Co., Ltd.); and a mixture thereof.

The compound (V) is formulated for preventing the metallic pigment from corrosion and selected from the group consisting of a phosphorus containing titanate coupling agent and a phosphoric mono- or di-ester of a C$_{11}$–C$_{24}$ organic compound. Typical examples of the titanate coupling agents are isopropyltriisostearoyltitanate, isopropyltridecylbenzensulfonyltitanate, isopropyltri(dioctyl pyrophosphate)titanate, tetraisopropylbis(dioctyl phosphite)titanate, tetra(2,2-diallyloxymethyl-1-butyl)bis(di- or tri-decyl) phosphatetitanate, bis(dioctyl pyrophosphate)oxyacetatetitanate and the like. Preferred are those having a pyrophosphate group, such as isopropyltri(dioctyl pyrophosphate)titanate and bis(dioctyl pyrophosphate)oxyacetatetitanate. Typical examples of the phosphoric mono- or di-esters are lauryl phosphate, stearyl phosphate, oleyl phosphate, nonylphenyl phosphate, dodecylphenyl phosphate and the like.

In the water borne metallic coating composition of the present invention, the fluorine containing compound (II) is present in an amount of 0.01 to 5 parts by weight, preferably 0.05 to 3.0 parts by weight, based on 100 parts by weight of the polymer (I). Amounts of less than 0.01 parts by weight does not impart good brightness to the coated film. Amounts of more than 5 parts by weight repel a clear paint to be coated thereon, thus resulting in poor appearance. The metallic pigment (III) is present in an amount of 2 to 30 parts by weight, based on 100 parts by weight of the polymer (I). Amounts of less than 2 parts by weight do not provide sufficient metallic luster. Amounts of more than 30 parts by weight deteriorate coating performances, such as adhesive ability, water resistance etc. and also decline metallic luster. The crosslinking agent (IV) is present in an amount of 5 to 120 parts by weight, preferably 8 to 80 parts by weight, based on 100 parts by weight of the polymer (I). The compound (V) is present in an amount of 0.04 to 30 parts by weight, preferably 0.06 to 15 parts by weight, based on 100 parts by weight of the polymer (I). If the compound (V) is less than 0.04 parts by weight, the corrosion resistance of the metallic pigment is poor. If it is more than 30 parts by weight, the technical effects in proportion to the amount are not obtained and are not advisable from economical viewpoint.

The water borne metallic coating composition of the present invention may further contain other additives, such as non-metallic pigment, thickner, filler and the like.

The coating composition can be prepared by any methods. For example, an aqueous dispersion or solution of the polymer (I) is mixed with the crosslinking agent (IV), to which the fluorine containing compound (II) and the compound (V) are added. Then, the metallic pigment (III) and optionally deionized water are added thereto to obtain the composition.

The metallic coating composition can be applied on a substrate by any methods, such as spraying, dipping or electrocoating.

The coating composition is suitable for the "Wet On Wet" metallic coating process. A clear paint is coated on the metallic coatings of the present invention. The clear paint may use any type which is known to the art, but an acrylic clear paint is preferred.

The water borne metallic coating composition of the present invention stably disperses a metallic pigment and does not generate dangerous hydrogen gas. It also provides good metallic appearance independently of coating conditions.

EXAMPLES

The present invention will be illustrated by the following examples which, however, are not construed as limiting to their details.

Preparation of the Film Forming Polymer (I)

Preparation Example 1

A one liter reaction vessel equipped with a stirrer, a temperature controller and a condenser was charged with 76 parts by weight of ethyleneglycol monobutyl ether, to which was added dropwise 61 parts by weight of a monomer solution which contained 15 parts by weight of styrene, 63 parts by weight of methyl methacrylate, 48 parts by weight of 2-hydroxyethyl methacrylate, 117 parts by weight of n-butyl acrylate, 27 parts by weight of methacrylic acid, 30 parts by weight of acrylamide and 3 parts by weight of azobisisobutylonitrile. It was heated to 120° C. with stirring. To the vessel, 245 parts by weight of the above mentioned monomer solution was added for 3 hours and then stirred for another one hour. Next, 28 parts by weight of dimethylethanolamine and 200 parts by weight of deionized water were added to obtain an acryl resin varnish having a novolatile content of 50%. The resin had a number average molecular weight of 12,000, an OH value of 70 and an acid value of 58.

Preparation Example 2

An acryl resin varnish having a nonvolatile content of 50% was prepared as generally described in Preparation Example 1, with the exception that a monomer solution, which contained 24 parts by weight of styrene, 73 parts by weight of methyl methacrylate, 48 parts by weight of 2-hydroxyethyl methacrylate, 117 parts by weight of n-butyl acrylate, 18 parts by weight of methacrylic acid, 20 parts by weight of methacrylamide and 3 parts by weight of azobisisobutylonitrile, was employed. The resin had a number average molecular weight of 12,000, an OH value of 70 and an acid value of 40.

Preparation Example 3

A 3 liter reaction vessel equipped with a nitrogen gas introducing tube, a temperature controller, a dropping funnel, a stirrer and a decanter was charged with 500 parts by weight of 2-ethoxypropanol and heated to 100° C. A monomer solution, which contained 50 parts by weight of styrene, 50 parts by weight of methyl methacrylate, 200 parts by weight of 2-hydroxyethyl methacrylate, 380 parts by weight of butyl acrylate, a mixture of 100 parts by weight of monobutyl maleate and 300 parts by weight of methanol, 100 parts by weight of acrylamide and 30 parts by weight of azobisisobutylonitrile, was added dropwise for 3 hours with removing methanol and mixed for another 30 minutes. Then, a solution of 50 parts by weight of butyl acetate and 3 parts by weight of t-butylperoxy-2-ethyl hexanoate was added dropwise for 0.5 hours and kept at 100° C. for 1.5 hours, while 300 parts by weight of methanol was distilled away. Next, 220 parts by weight of the solvent was distilled away under reduced pressure. It was then mixed with 100 parts by weight of dimethylethanolamine and 570 parts by weight of deionized water to obtain transparent and viscous an acryl resin aqueous varnish having a nonvolatile content of 50%. The resin had a number average molecular weight of 10,000.

Preparation of a clear coating paint

Preparation Example 4

A clear paint was prepared by mixing the following ingredients;

| Ingredient | Parts by weight |
| --- | --- |
| Varnish[1] | 100 |
| U-ban 20SE-60*[1] | 36 |
| Modaflow (Monsant Company)*[2] | 0.5 |
| Resin particles[2] | 2.2 |

[1] A reaction vessel equipped with a stirrer, a temperature controller and a condenser was charged with 70 parts by weight of xylene and 20 parts by weight of n-butanol, to which was added dropwise 20 parts by weight of a monomer solution which contained 1.2 parts by weight of methacrylic acid, 26.4 parts by weight of styrene, 26.4 parts by weight of methyl methacrylate, 36.0 parts by weight of n-butyl acrylate, 10.0 parts by weight of 2-hydroxyethyl acrylate and 1.0 parts by weight of azobisisobutylonitrile. It was heated with stirring. To the vessel, the balance of the monomer mixture was added dropwise for 2 hours with refluxing. A solution of 0.3 parts by weight of azobisisobutylonitrile and 10 parts by weight of xylene was added for 30 minutes. The resultant solution was heated to reflux for another 2 hours to terminate the reaction to obtain an acryl resin varnish having a nonvolatile content of 50. The resin had a number average molecular weight of 8,000 and an OH value of 48.
[2] A reaction vessel was charged with 134 parts by weight of bishydroxyethyl taurine, 130 parts by weight of neopentyl glycol, 236 parts by weight of azelaic acid, 186 parts by weight of phthalic anhydride and 27 parts by weight of xylene, and heated. Water produced by the reaction was azeotropically distilled away and the reaction was continued until an acid value was 145. After cooling to 140° C., 314 parts by weight of Cardula E 10 (a varsatic acid glycidyl ester available from Shell Chemical Company) was added dropwise for 30 minutes and then reacted for another 2 hours. The obtained polyester resin had a number average molecular weight 1054, an acid value of 59 and a hydroxyl value of 90. A one liter reaction vessel was charged with 282 parts by weight of deionized water, 10 parts by weight of the above obtained polyester resin and 0.75 parts by weight of dimethylethanolamine, and dissolved with mixing at 80° C. A solution of 45 parts by weight of azobiscyanovaleronitrile, 45 parts by weight of deionized water and 4.3 parts by weight of dimethylethanolamine was added thereto and then a mixture of 70.7 parts by weight of methyl methacrylate, 94.2 parts by weight of n-butyl acrylate, 70.7 parts by weight of styrene, 30 parts by weight of 2-hydroxyethyl acrylate and 4.5 parts by weight of ethyleneglycol dimethacrylate was added dropwise for 60 minutes. After finishing the addition, another solution of 1.5 parts by weight of azobiscyanovaleronitrile, 15 parts by weight of deionized water and 1.4 parts by weight of dimethylethanolamine was added and mixed for 60 minutes at 80° C. to obtain an emulsion having a particle size of 0.156 micron, a nonvolatile content of 45%, a pH of 7.2 and a viscosity (25° C.) of 92 cps. The emulsion was spray-dried and then dispersed in xylene to obtain a xylene dispersion of resin particles of 0.3 micron.
*[1] A crosslinking agent (butylated melamine) available from Mitsui Toatsu Company.
*[2] An additive available from Monsanto Company.

Preparation Example 5

A clear paint was prepared by mixing the following ingredients.

| Ingredients | Parts by weight |
|---|---|
| Varnish[3] | 100 |
| Desmodule N-75*[3] | 16.7 |

[3]A reaction vessel was charged with 57 parts by weight of xylene and 6 parts by weight of n-butanol, to which 20 parts by weight of a monomer solution containing 30.0 parts by weight of styrene, 45.2 parts by weight of ethylhexyl methacrylate, 5.5 parts by weight of ethylhexyl acrylate, 16.2 parts by weight of 2-hydroxyethyl methacrylate, 3.1 parts by weight of methacrylic acid and 4.0 parts by weight of azobisisobutylonitrile was added and heated with stirring. With refluxing, the balance of the monomer solution was added dropwise for 2 hours, and then a solution of 0.5 parts by weight of azobisisobutylonitrile, 28 parts by weight of xylene and 14 parts by weight of n-butanol was added dropwise for 20 minutes. The resultant solution was mixed with refluxing for 2 hours to terminate the reaction. The obtained acryl varnish had a nonvolatile content of 50%, a number average molecular weight of 3,400 and an OH value of 70.

*[3]A crosslinking agent (isocyanate compound) available from Sumitomo Bayer Company.

Preparation Example 6

A clear paint was obtained by mixing the following ingredients and diluted with a thinner of butyl acetate/xylene of 1/1.

| Ingredients | Parts by weight (g) |
|---|---|
| An acryl polymer having carboxylic anhydride group[4] | 130 |
| Blocked amine[5] | 25 |
| A polymer having an alkoxysilyl group[6] | 65 |
| Tinubin 900*[4] | 1.5 |
| Ilukanox 1010*[5] | 1.0 |

[4]A one liter reaction vessel equipped with a thermometer, a stirrer, a condenser and a nitrogen gas introducing tube was charged with 120 parts by weight of butyl acetate and heated to 100° C. A monomer solution which contained 21 parts by weight of n-butyl acrylate, 95 parts by weight of n-butyl methacrylate, 34 parts by weight of 2-ethylhexyl methacrylate, 45 parts by weight of itaconic anhydride, 60 parts by weight of dioxane and 20 parts by weight of t-butylperoxy hexanoate was added dropwise for 3 hours and mixed for another 2 hours to obtain an acryl resin having a nonvolatile content 51% and a number average molecular weight of 2,500.

[5]A reaction vessel was charged with 133 g of diisopropanolamine and 70 g of toluene, to which 76 g of isobutylaldehyde was added dropwise for one hour under cooling with ice. It was then heated to reflux with removing produced water and kept to react for 5 hours. After cooling to room temperature, 84 g of 1,6-hexane diisocyanate and 20 g of xylene were added dropwise for one hour and reacted for 8 hours at 70 to 80° C. to obtain an oxazolidine blocked amine.

[6]A reaction vessel was charged with 200 g of xylene and heated to 120° C., to which was added dropwise for 3 hours a monomer solution which contained 150 g of 3-methacryloxypropyltrimethoxysilane, 20 g of n-butyl acrylate, 30 g of methyl melthacrylate and 15 g of t-butyl peroxyhexanoate. It was reacted for another 2 hours to obtain a polymer having an alkoxysilyl group of nonvolatile content 50% and number average molecular weight 2,000.

*[4]An additive available from Ciba Geigy Company.
*[5]An additive available from Ciba Geigy Company.

Preparation Example 7

A clear paint was obtained by mixing the following ingredients and diluted with a thinner of butyl acetate/xylene of 1/1.

| Ingredients | Parts by weight (g) |
|---|---|
| An acryl polymer having carboxylic anhydride group[4] | 130 |
| Oxazolidine compound[7] | 13 |
| A polymer having an alkoxysilyl group[6] | 65 |
| 3,4-epoxycyclohexylmethyl-3,4-epoxycyclohexane carboxylate | 7 |
| Tinubin 900 | 1.5 |
| Ilukanox 1010 | 1.0 |

[7]A reaction vessel was charged with 133 g of diisopropanolamine and 200 g of benzene, to which 75 g of isobutylaldehyde was added dropwise at room temperature for 90 minutes. It was then heated to reflux with removing produced water and kept to react for 5 hours. Benzene was removed under reduced pressure to obtain a hydroxyoxazolidine compound. The compound was mixed with 1,000 g of hexane and 103 g of triethylamine, to which 64.6 g of dichlorodimethylsilane was added dropwise at 0° C. for 2 hours. It was then allowed to react at room temperature for 2 hours and filtered. The filtrate was condensed to obtain an oxazolidine compound.

Preparation of Metallic Pigment Composition

Preparation Example 8

A reaction vessel equipped with a stirrer, a thermometer and a dropping funnel was charged with 53 parts by weight of mono- and di-2-ethylhexyl phosphate (mono-/di-ester ratio=about 1/1 and acid value=324 KOH mg/g) and 50 parts by weight of toluene, and heated to 80° C. with mixing. To the content, 8.4 parts by weight of 3-(2-perfluorohexyl)ethoxy-1,2-epoxypropane was added dropwise for one hour and then reacted at 80° C. for another one hour. Toluene was removed under reduced pressure to obtain a viscous phosphorus compound which had an acid value of 308 KOH mg/g.

The phosphorus compound was dissolved in 300 parts by weight of acetone, to which 75 parts by weight of aluminum paste (MC-666 having an aluminum content of 65%, available from Asahi Chemical Industries Co., Ltd.) was dispersed. It was mixed at room temperature for one hour and condensed to obtain an aluminum pigment composition having a metal content of 65%.

Preparation Example 9

A flask equipped with a stirrer and a thermometer was charged with 10 parts by weight of 2,2'-m-phenylenebis(2-oxazoline), 52.6 parts by weight of mono- and di-2-ethylhexylphophate having a molar ratio of mono-ester/diester of about 1/1 and an acid value of 324 KOH mg/g and 50 parts by weight of toluene and heated to 80° C. with stirring to form a transparent solution. After reacting at 80° C. for 2 hours, toluene was removed under reduced pressure to obtain a product of 62.6 parts by weight (acid value 209 KOH mg/g). An IR spectrum shows an absorption of 1,540 cm$^{-1}$ (amide group) to find that the product is a mixture of the starting materials (mono- and di-2-ethylhexyl phosphate) and the compounds represented by the following formula;

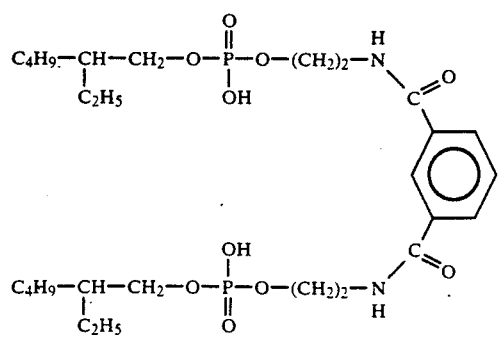

-continued

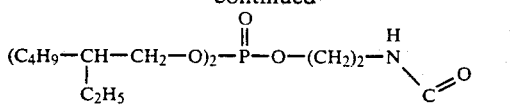

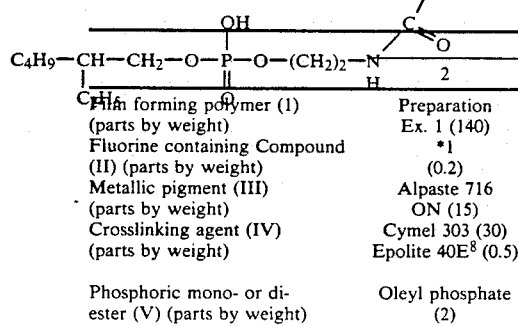

The phosphorus compound was dissolved in 300 parts by weight of acetone, to which 75 parts by weight of aluminum paste (MC-666 having an aluminum content of 65%, available from Asahi Chemical Industries Co., Ltd.) was dispersed. It was mixed at room temperature for one hour and condensed to obtain an aluminum pigment composition having a metal content of 65%.

Preparation of Water Borne Metallic Coating Paint

Example 1

Fifteen parts by weight of an aluminum pigment paste (Alpaste 7160N, Al metallic content=65%, avalilable from Toyo Aluminum K. K.) was mixed with 30 parts by weight of Cymel 303 (methoxylated methylolmelamine). Then, 2 parts by weight of isostearyl phosphate (Phoslex A-180L available from Sakai Chemical Industry Co., Ltd.) and 0.4 parts by weight of 1,6-hexanediol glycidyl ether (Epolite #1600 available from Kyoeisha Yushi Company) were mixed therewith to form an aluminum pigment solution.

Next, 140 parts by weight of the film forming polymer of Preparation Example 1 was dispersed with the above obtained aluminum pigment solution, to which 0.4 parts by weight of potassium perfluoroalkylcarbonate (EF 112 available from Mitsubishi Metal Corp.) was added to form a water borne metallic paint.

Examples 2 to 5

A water borne metallic paint was prepared using ingredients shown in Table 1 as generally described in Example 1.

TABLE 1

| | Example No. | | | |
|---|---|---|---|---|
| | 2 | 3 | 4 | 5 |
| Film forming polymer (I) (parts by weight) | Preparation Ex. 1 (140) | Preparation Ex. 1 (140) | Preparation Ex. 2 (140) | Preparation Ex. 2 (140) |
| Fluorine containing Compound (II) (parts by weight) | *1 (0.2) | *2 (0.1) | *1 (0.3) | *2 (0.2) |
| Metallic pigment (III) (parts by weight) | Alpaste 716 ON (15) | Alpaste 716 ON (15) | Alpaste 716 ON (15) | Alpaste 716 ON (15) |
| Crosslinking agent (IV) (parts by weight) | Cymel 303 (30) Epolite 40E[8] (0.5) | Cymel 303 (25) Sumimal M30W[9] (15) | Cymel 303 (40) Epototo YD 8125[10] (0.8) | Cymel 303 (25) Sumimal M50W (5) Epicoat 1001[11] (1) |
| Phosphoric mono- or di-ester (V) (parts by weight) | Oleyl phosphate (2) | Nonyl phenyl phosphate (2) | Isostearyl phosphate (2) | Lauryl phosphate (2) |

*1 Potaasium perfluoroalkylcarbonate EF112
*2 Perfluoroalkylperfluorosulfonic acid EF101 available from Mitsubishi Metal Corp.
[8] Kyoeisha Yushi Company
[9] Sumitomo Chemical Co., Ltd.
[10] Toto Kasei Company
[11] Yuka Shell Company

Example 6

A water borne metallic paint was prepared as generally described in Example 1, with the exception that the aluminum pigment composition of Preparation Example 8 was employed instead of the aluminum paste of Example 1.

Example 7

A water borne metallic paint was prepared as generally described in Example 1, with the exception that the aluminum pigment composition of Preparation Example 9 was employed instead of the aluminum paste of Example 1.

Example 8

A water borne metallic paint was prepared as generally described in Example 1, with the exception that diisopropylbis(dioctylpyrophosphte) titanate was employed instead of nonylphenyl phosphate of Example 3. [The metallic paints of Examples 1 to 8 did not generate hydrogen gas and precipitation after storing at 40° C. for one month.]

Comparative Examples 1

A film forming polymer was prepared as generally described in Preparation Example 1, with the exception that 45 parts by weight of styrene was employed and acrylamide was not employed.

A metallic paint was prepared as generally described in Example 1, with the exception that the film forming polymer obtained above was employed instead of the film forming polymer of Preparation Example 1 and potassium perfluoroalkylcarbonate was not employed.

Comparative Example 2

A metallic paint was prepared as generally described in Example 1, with the exception that potassium perfluoroalkylcarbonate was not employed.

Test Example

A polished mild steel panel which had been degreased was electrocoated with an electrocoating paint for automobiles and baked. The panel was then intercoated with an intercoating paint for automobiles.

The intercoated steel panel was coated with one of the water borne metallic paints of Examples 1 to 8 and Comparative Examples 1 and 2 and then clear-coated with one of the clear paints of Preparation Examples 4 to 7 by spray coating at 23° C. and a relative humidity of 60% to form a dried metallic layer of 20 micron and a dried clear layer of 30 micron. The water borne metallic paint was coated two stages and an interval of one minute and, after drying for 5 minutes, the clear paint was coated one stage and then a setting of 7 minutes was conducted. The coated panel was then baked at 140° C. for 30 minutes to obtain a sample panel. The adhesive properties and water resistance of the coatings were evaluated and the results are shown in Table 2.

Adhesive properties was evaluated as follow: The coated panel was cross-cutted with a knife and an adhesive tape was put thereon and removed. Good shows no peels and bad shows there are peels.

Water resistance was evaluated as follow: The coated panel was immersed in a hot water at 50° C. for 10 days and changes of the coating surface were evaluated with eyes. Good shows no changes and bad shows reduced luster.

TABLE 2

| Coated panel No. | Water borne metallic paint | | Clear paint | Appearance | Adhesive properties | Water resistance |
| --- | --- | --- | --- | --- | --- | --- |
| 1 | Ex. 1 | | Pre. Ex. 4 | good | good | good |
| 2 | | 1 | 5 | good | good | good |
| 3 | | 1 | 6 | good | good | good |
| 4 | | 1 | 7 | good | good | good |
| 5 | | 2 | 4 | good | good | good |
| 6 | | 2 | 6 | good | good | good |
| 7 | | 2 | 7 | good | good | good |
| 8 | | 3 | 6 | good | good | good |
| 9 | | 4 | 6 | good | good | good |
| 10 | | 5 | 4 | good | good | good |
| 11 | | 6 | 4 | good | good | good |
| 12 | | 4 | 7 | good | good | good |
| 13 | | 5 | 7 | good | good | good |
| 14 | | 6 | 7 | good | good | good |
| 15 | | 7 | 4 | good | good | good |
| 16 | | 7 | 5 | good | good | good |
| 17 | | 7 | 6 | good | good | good |
| 18 | | 7 | 7 | good | good | good |
| 19 | | 8 | 4 | good | good | good |
| 20 | | 8 | 7 | good | good | good |
| 21 | Comp. Ex. 1 | | 4 | bad | bad | good |
| 22 | | 2 | 4 | bad | good | bad |

What is claimed is:

1. A water borne metallic coating composition comprising:
   - (I) a film forming polymer having a number average molecular weight of 6,000 to 50,000, prepared by copolymerizing a monomer mixture of 5 to 40% by weight of an amide group containing ethylenic monomer, 3 to 15% by weight of an acid group containing ethylenic monomer, 10 to 40% by weight of a hydroxyl group containing ethylenic monomer and the balance of other ethylenic monomer followed by neutralizing at least a portion of the acid group; % by weight being based on the total monomer weight,
   - (II) a fluorine containing compound which has a $C_nF_{2n+1}-$ or $-C_nF_{2n}-$ group wherein n is an integer of 1 to 20, and also at least one acid group or a salt of said acid group,
   - (III) a metallic pigment,
   - (IV) a crosslinking agent added to crosslink with said polymer (I), which crosslinking agent is selected from at least one group consisting of an amino compound, an isocyanate compound and an epoxy compound,
   - (V) a compound selected from the group consisting of a phosphorus containing titanate coupling agent and a phosphoric mono- or di-ester of a $C_{11}-C_{24}$ organic compound;
   wherein said compound (II) is present in an amount of 0.01 to 5 parts by weight, said pigment (III) is present in an amount of 2 to 30 parts by weight, said agent (IV) is present in an amount of 5 to 120 parts by weight and the compound (V) is present in an amount of 0.04 to 30 parts by weight, based on 100 parts by weight of the polymer (I).

2. The water borne metallic coating composition according to claim 1 wherein said amide group containing ethylenic monomer is acrylamide, N-methylolacrylamide, methacrylamide, N-methylolmethacrylamide or alkoxymethyl(meth)acrylamide.

3. The water borne metallic coating composition according to claim 1 wherein said acid group containing ethylenic monomer is acrylic acid, methacrylic acid, crotonic acid, ethacrylic acid, propylacrylic acid, isopropylacrylic acid or t-butylacrylamide sulfonic acid.

4. The water borne metallic coating composition according to claim 1 wherein a portion of said acid group containing ethylenic monomer of the film forming polymer is a half-ester, half-amide or half-thioester of a dibasic acid.

5. The water borne metallic coating composition according to claim 1 wherein said hydroxyl group containing ethylenic monomer is hydroxyethyl acrylate, hydroxypropyl acrylate, hydroxybutyl acrylate, hydroxymethyl methacrylate, hydroxyethyl methacrylate, hydroxypropyl methacrylate, hydroxybutyl methacrylate or allyl alcohol.

6. The water borne metallic coating composition according to claim 1 wherein said fluorine containing compound (II) is $CF_3CO_2H$, $C_3F_7CO_2H$, $C_7F_{15}CO_2H$, $C_8F_{17}CO_2H$, $HO_2C-(CF_2)_4-CO_2H$, $[C_8F_{17}SO_2N(CH_3)C_2H_4O]_2PO(OH)$, $[C_8F_{17}SO_2N(CH_3)C_2H_4O]_2PO(ONH_4)$, $C_8F_{17}SO_2N(CH_3)C_2H_4OSO_3H$, $C_8F_{17}SO_2N(C_3H_7)CH_2CO_2K$, $C_8F_{17}SO_3Na$, $C_8F_{17}SO_3NH_4$ or $C_8F_{17}SO_3Li$.

7. The water borne metallic coating composition according to claim 1 wherein said metallic pigment (III) is aluminum flakes.

8. The water borne metallic coating composition according to claim 1, wherein said metallic pigment (III) before added to said composition is preformulated in the form of a mixture of 100 parts by weight of the metallic pigment and 2 to 100 parts by weight of a reaction product prepared by reacting an organic phosphate (VI) represented by

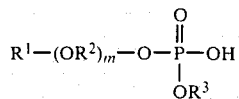

wherein $R^1$ represents a $C_2$-$C_{24}$ alkyl group, a $C_2$-$C_{24}$ alkenyl group or an aryl group having at least one $C_2$-$C_{24}$ alkyl substituent, $R^2$ represents a $C_2$-$C_4$ alkylene group, $R^3$ represents a hydrogen atom, a $C_2$-$C_{24}$ alkyl group, a $C_2$-$C_{24}$ alkenyl group, a $C_6$-$C_{24}$ aryl group, a $C_6$-$C_{24}$ alkaryl group or a $R^1$-$(OR^2)_m$-group, and m is 0 or an integer of 1 to 20, with a fluorine containing compound (VII) having a $C_nF_{2n+1}$— or —$C_nF_{2n}$— group wherein n is an integer of 1 to 20 and at least one primary hydroxyl group or epoxy group, in molar ratio (VI)/(VII) of 1/1 to 1/0.01.

9. The water borne metallic coating composition according to claim 1 wherein said crosslinking agents (IV) are a blocked polyisocyanate, an alkoxylated melamineformaldehyde condensate or an epoxy compound having at least two epoxy group.

10. The water borne metallic coating composition according to claim 1 which further contains a non-metallic pigment, a thickener or a filler.

* * * * *